(12) United States Patent
Wolf et al.

(10) Patent No.: US 6,647,327 B1
(45) Date of Patent: Nov. 11, 2003

(54) SYSTEM AND METHOD FOR DATA EXCHANGE IN A VEHICLE MULTIMEDIA SYSTEM

(75) Inventors: Stefan Wolf, Muehltal (DE); Dirk Lappe, Karlsruhe (DE)

(73) Assignee: Becker GmbH, Karlsbad (DE)

( * ) Notice: Subject to any disclaimer, the term of this patent is extended or adjusted under 35 U.S.C. 154(b) by 0 days.

(21) Appl. No.: 09/713,774

(22) Filed: Nov. 15, 2000

(30) Foreign Application Priority Data

Nov. 15, 1999 (DE) .......................................... 199 54 758

(51) Int. Cl.[7] .......................... G05D 1/00; G08G 1/123
(52) U.S. Cl. ........................ 701/36; 370/419; 370/508; 370/345; 370/401; 369/13.56; 369/18; 369/30.03; 455/149; 455/151.4
(58) Field of Search .......................... 701/36; 370/419, 370/420, 508, 395, 401; 375/257, 259; 340/539; 455/149, 151.4; 381/1; 725/74; 369/13.56, 18, 30.03

(56) References Cited

U.S. PATENT DOCUMENTS

| | | | | |
|---|---|---|---|---|
| 5,552,921 A | * | 9/1996 | Hetzel et al. ................ 359/173 |
| 5,633,629 A | * | 5/1997 | Hochstein ................... 340/907 |
| 5,689,252 A | * | 11/1997 | Ayanoglu et al. ........... 340/991 |
| 5,983,087 A | * | 11/1999 | Milne et al. ................. 455/149 |
| 5,995,512 A | * | 11/1999 | Pogue, Jr. .................... 370/419 |
| 6,078,622 A | * | 6/2000 | Boytim et al. .............. 375/257 |
| 6,148,253 A | * | 11/2000 | Taguchi et al. ............... 701/48 |
| 6,157,725 A | * | 12/2000 | Becker ......................... 381/86 |
| 6,233,506 B1 | * | 5/2001 | Obradovich et al. ........... 701/1 |

FOREIGN PATENT DOCUMENTS

| | | |
|---|---|---|
| DE | 197 37 325 A1 | 3/1999 |
| EP | 0 748 727 A1 | 12/1996 |
| EP | 0 749 225 A2 | 12/1996 |
| EP | 859495 A2 * | 8/1998 |
| EP | 0932132 * | 7/1999 |

OTHER PUBLICATIONS

Heck et al., "Media oriented synchronous transfer–A network protocol for high quality, low cost transfer of synchronous, asynchronous, and control data on fiber optic."

* cited by examiner

Primary Examiner—Thomas G. Black
Assistant Examiner—Tuan L To
(74) Attorney, Agent, or Firm—Samuels, Gauthier & Stevens, LLP

(57) ABSTRACT

In a multimedia system for a vehicle, a plurality of multimedia units are connected to one another by an optical bus laid as a ring line. An interface unit, situated at an arbitrary point in the ring line or integrated into one of the multimedia units establishes a radio connection between the multimedia system and an external unit, which for example transmits traffic information to the multimedia system.

20 Claims, 1 Drawing Sheet

SYSTEM AND METHOD FOR DATA EXCHANGE IN A VEHICLE MULTIMEDIA SYSTEM

BACKGROUND OF THE INVENTION

The invention relates to a system and method for data exchange for a multimedia system for a vehicle, with several units, which are connected to one another through an optical data bus laid as a ring line in the vehicle.

Multimedia systems are already standard equipment in top class motor vehicles. In a multimedia system for a motor vehicle, several units are connected to one another by an optical data bus, which is laid as a ring line so data exchange is possible between arbitrary units of the ring line.

Convenient, modem multimedia systems for vehicles are equipped, for example, with an audio system that includes an audio radio receiving system, a cassette unit, an audio CD player, loudspeakers, a television receiver, a .VCR, a DVD player, a navigation system, a mobile telephone, a fax machine, an onboard computer, a keyboard, and a monitor. Of course the number of units will increase in the future.

Therefore, there is a need for a technique for exchanging data in a vehicle multimedia system.

SUMMARY OF THE INVENTION

Briefly, according to an aspect of the present invention, a multimedia system suitable for use in vehicle and capable of communicating with an external unit, includes an interface unit, a plurality of multimedia units, and an optical data bus configured as a ring line in the vehicle. The interface unit and the plurality of multimedia units are each connected to the optical data bus. The interface unit establishes a radio connection with the external unit, and the interface unit receives multimedia data over the radio connection and sends the received multimedia data over the optical data bus to at least one of the multimedia units.

The interface unit may be located at an arbitrary point in the ring line to establish the radio connection with the external unit.

These and other objects, features and advantages of the present invention will become apparent in light of the following detailed description of preferred embodiments thereof, as illustrated in the accompanying drawings.

DETAILED DESCRIPTION OF THE INVENTION

Figure 1:
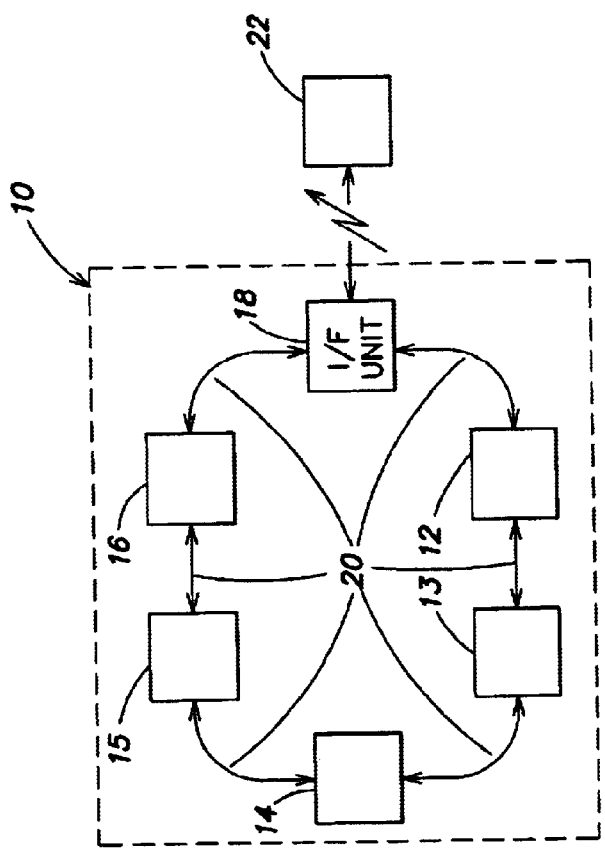
FIG. 1 illustrates a vehicle multimedia system.

FIG. 1 illustrates a multimedia system 10 that includes a plurality of multimedia units 12–16 and an interface unit 18, interconnected by a ring line 20 (e.g., an optical data bus). Upon request of one of the multimedia units 12–16, the interface unit 18 establishes a radio connection with an external unit 22. The data sent by the external unit 22 to the multimedia system 10 are received by the interface unit 18 and forwarded to the appropriate unit 12–16 via the ring line 20. The interface unit 18 can be located at an arbitrary point in the ring line.

The interface unit 18 coordinates requests of the multimedia units 12–16 situated in the ring line 20 for radio connection to the external unit 22. If the interface unit 18 receives several .requests for a radio connection to the external unit simultaneously from several units 12–16 in the ring line 20, the interface unit 18 determines the sequence for processing the requests in accordance with a specifiable method. For example, the interface unit 18 can determine the sequence for processing the requests according to the sequence of requesting units in the ring line 20. However, it may also select the sequence for processing the requesting units randomly.

In one embodiment, the external unit 22 may be configured as a service unit that transmits traffic information. For example, if the multimedia system 10 is equipped with a navigation system, the operator can request traffic information from the external unit 22 via the navigation system. However, data can also be transmitted in the reverse direction. For example, the operator can transmit information that describes local traffic conditions via the interface unit 18 to the external unit 22, which can process this current on-site information to provide the requesting multimedia system with information and instructions appropriate to the traffic situation that prevails locally at the moment.

Figure 2:
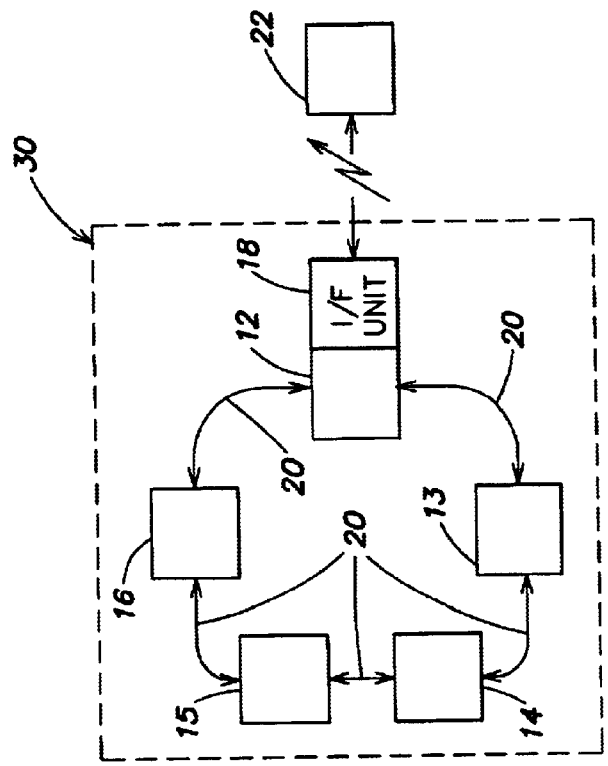
FIG. 2 illustrates an alternative embodiment multimedia system.

FIG. 2 illustrates an alternative embodiment multimedia system 30, in which the interface unit 18 is not disposed separately in the ring line 20, but rather is integrated into one of the multimedia units (e.g., the unit 12).

An advantage of a system according to the present invention is that in the transmission of data between the multimedia system (e.g., 10 or 30) and the external unit 22, the external unit 22 always sees the same interface (i.e., the interface 18), regardless of the unit in the ring line that is currently communicating.

Technical systems, such as for example media-oriented system transfer (MOST), General Packet Radio Services (GPRS), Universal Mobile Telephone System, (UMTS), and the Short Message Services (SMS) can all be integrated into the inventive vehicle multimedia system. However, the inventive multimedia system is not limited to these systems or automotive vehicles.

Although the present invention has been shown and described with respect to several preferred embodiments thereof, various changes, omissions and additions to the form and detail thereof, may be made therein, without departing from the spirit and scope of the invention.

What is claimed is:

1. A method of data exchange in a vehicular multimedia system that includes an interface unit and a plurality of multimedia units each connected to a data bus configured as a ring line in the vehicle, comprising:

establishing a radio connection between the interface unit and an external unit;

receiving from the multimedia units requests for the radio connection with the external unit; and coordinating/arbitrating at the interface unit requests for radio connection to the external unit.

2. The method of claim 1, wherein establishing a radio connection comprises:

transmitting data/commands over the radio connection in both directions between the interface unit and the external unit.

3. The method of claim 1, further comprising:

receiving multimedia data at the interface unit via the radio connection; and sending the received multimedia data from the interface unit over the data bus to at least one of the plurality of multimedia units.

4. The method of claim 1, wherein coordinating/arbitrating requests for radio connection comprises:

determining a sequence for processing simultaneously received requests.

5. The method of claim 4, wherein determining a sequence for processing requests comprises:

determining with a random selection criteria the sequence for processing simultaneously received requests.

6. A multimedia system suitable for use in a vehicle and capable of communicating with an external unit, comprising:

an interface unit;

a plurality of multimedia units;

data bus configured as a ring line in the vehicle, wherein said interface unit and said plurality of multimedia units are each connected to said data bus; and wherein said interface unit establishes a radio connection with the external unit, and wherein said interface unit comprises a coordination unit that coordinates requests received over said data bus from said multimedia units for radio connections to the external unit.

7. The multimedia system of claim 6, wherein said interface unit is located at an arbitrary location along said data bus.

8. The multimedia system of claim 6, wherein said interface unit receives multimedia data over the radio connection and sends the received multimedia data over said data bus to at least one of said multimedia units.

9. The multimedia system of claim 6, wherein said interface unit is situated in the ring line as a separate unit.

10. The multimedia system of claim 6, wherein said interface unit is integrated into one of said multimedia units situated in the ring line.

11. The multimedia system of claim 6, wherein said interface unit further comprises:

means for receiving a request from at least one of said multimedia units, for processing said received request, and for communicating with the external unit over the radio connection to fulfill said received request.

12. The multimedia system of claim 8, wherein said interface unit further comprises:

means for establishing full duplex radio communication between said interface unit and the external unit.

13. A multimedia system for a vehicle comprising a plurality of multimedia units connected to one another by data bus laid as a ring line in the vehicle, wherein an interface unit is situated at an arbitrary point of the ring line and is configured to establish a radio connection between the multimedia system and an external unit, wherein said interface unit coordinates requests generated by the multimedia units, said requests being for radio connection with the external interface.

14. The multimedia system of claim 13 wherein the interface unit is situated in the ring line as a separate unit.

15. The multimedia system of claim 13, wherein the interface unit comprises:

a coordination unit configured to perform said coordination of the requests for radio connections to the external unit, which it receives from the multimedia units in the ring line.

16. The multimedia system of claim 13, wherein the interface unit is situated in the ring line as a separate unit.

17. The multimedia system of claim 13, wherein the interface unit is integrated into one of the multimedia units.

18. The multimedia system of claim 13, wherein the external unit comprises a service center that transmits traffic information in response to requests transmitted from said interface unit.

19. The multimedia system of claim 18, wherein the external unit transmits or receives traffic information from the multimedia system.

20. The multimedia system of claim 8, wherein said coordination unit comprises:

means for determining with a random selection criteria the sequence for processing simultaneously received requests.

\* \* \* \* \*

UNITED STATES PATENT AND TRADEMARK OFFICE
CERTIFICATE OF CORRECTION

PATENT NO. : 6,647,327 B1 Page 1 of 1
APPLICATION NO. : 09/713774
DATED : November 11, 2003
INVENTOR(S) : Wolf et al.

It is certified that error appears in the above-identified patent and that said Letters Patent is hereby corrected as shown below:

Column 1
line 17, delete "modem" and insert --modern--
line 20, before "VCR" delete "."

Column 2
line 2, before "requests" delete "."

Column 3
In the claims, claim 6, line 15, before "data bus" insert --a--

Column 4
In the claims, claim 13, line 7, before "data bus" insert --a--

Signed and Sealed this

Twenty-seventh Day of February, 2007

JON W. DUDAS
*Director of the United States Patent and Trademark Office*